United States Patent

[11] 3,624,254

| [72] | Inventor | Chester E. Pawloski<br>Bay City, Mich. |
|---|---|---|
| [21] | Appl. No. | 16,978 |
| [22] | Filed | Mar. 5, 1970 |
| [45] | Patented | Nov. 30, 1971 |
| [73] | Assignee | The Dow Chemical Company<br>Midland, Mich. |

[54] HEXAMETHYLENETETRAMINE ADDUCTS WITH HALOACETONITRILES
4 Claims, No Drawings

[52] U.S. Cl. ............................................. 260/248.5, 424/249
[51] Int. Cl. ....................................... C07d 55/14

[50] Field of Search............................................. 260/248.5

[56] References Cited
UNITED STATES PATENTS
3,524,854   8/1970   Kuhn........................... 260/248.5

*Primary Examiner*—John M. Ford
*Attorneys*—Griswold & Burdick and C. E. Rehberg ABSTRACT: New compositions are made by the 1:1 molar reaction of hexamethylenetetramine with a haloacetonitrile. The quaternary salts thus formed are colorless crystalline solids, readily soluble in water and having biological activity. They are bactericides which also have fungicidal and herbicidal activity.

HEXAMETHYLENETETRAMINE ADDUCTS WITH HALOACETONITRILES

BACKGROUND OF THE INVENTION

Hexamethylenetetramine is known to form quaternary salt adducts with certain halohydrocarbons (Wolf and Scott, U.S. Pat. No. 3,228,829). These adducts show bactericidal and other biological activity.

SUMMARY OF THE INVENTION

New, biologically active quaternary salts are made by the reaction of hexamethylenetetramine (hereinafter, HMTA) with a haloacetonitrile in a 1:1 molar ratio. These salts are colorless, water-soluble, stable, crystalline compounds having high activity as bactericides as well as other biological activity. These compounds have the formula

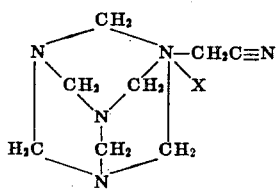

wherein X is Cl, Br or I.

The above compounds are conveniently made by contacting HMTA and the appropriate haloacetonitrile in a suitable inert solvent. The products are insoluble in most common organic solvents; hence, they precipitate from such solvents as they are formed. Suitable such solvents include a halohydrocarbons such as methylene chloride, chloroform, perchloroethylene and the like.

SPECIFIC EMBODIMENTS OF THE INVENTION

A. Preparation of Compounds, General Procedure

Essentially equimolar amounts of HMTA and haloacetonitrile were dissolved in chloroform, about 1.5–3.5 l. of the latter being used per g. mole of HMTA. The solutions were stirred at room temperature for at least 6–8 hr., though the reaction appeared to be complete in less time. The products precipitated as colorless crystals as the reaction proceeded. The crystals were separated by filtration and dried in vacuum. No attempt was made to recover product or unused reactant from the filtrate. Results are tabulated below.

TABLE I

| | HMTA—Haloacetronitrile Salts | | |
|---|---|---|---|
| Example | Halogen | % Yield | M.P., °C. |
| 1 | Cl | 61 | 154 |
| 2 | Br | 95 | 193(d) |
| 3 | I | 67 | 140–42(d) |

The compounds of the invention have a wide spectrum of biological activity.

Thus, the compounds of examples 1 and 3, when incorporated into a typical agar culture medium at a level of 0.05 percent, was 100 percent effective in preventing the growth of such organisms as Pseudomonas aeroginosa, Staph. aureus, E. coli, B. subtilis, Aerobacter aerogenes, Candida pelliculosa, Salmonella typhosa and Mycobacterium Phlei.

The compound of example 2, in addition to being active against some of the above organisms, also showed activity against such diverse organisms as pigweed, apple scab and mouse tapeworm.

I claim:

1. A compound having the formula

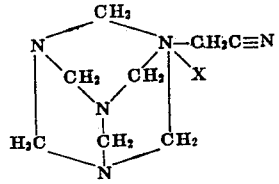

wherein X is Cl, Br or I.
2. The compound of claim 1 wherein x is Cl.
3. The compound of claim 1 wherein X is Br.
4. The compound of claim 1 wherein X is I.

* * * * *